(12) United States Patent
Bostrom et al.

(10) Patent No.: US 7,168,671 B2
(45) Date of Patent: Jan. 30, 2007

(54) LOW PROFILE SEAT SUSPENSION

(75) Inventors: John M. Bostrom, Waterford, WI (US); Wayne R. Block, South Milwaukee, WI (US); James R. Brzenk, Milwaukee, WI (US); Matthew C. Horn, Elkhorn, WI (US)

(73) Assignee: H.O. Bostrom Company, Inc., Waukesha, WI (US)

( * ) Notice: Subject to any disclaimer, the term of this patent is extended or adjusted under 35 U.S.C. 154(b) by 161 days.

(21) Appl. No.: 10/863,694

(22) Filed: Jun. 8, 2004

(65) Prior Publication Data

US 2005/0001133 A1    Jan. 6, 2005

Related U.S. Application Data

(60) Provisional application No. 60/477,618, filed on Jun. 11, 2003.

(51) Int. Cl.
 *F16M 13/00* (2006.01)
(52) U.S. Cl. .................. 248/419; 248/424; 297/345
(58) Field of Classification Search ........... 248/157, 248/419, 420, 421, 424; 297/345, 348
See application file for complete search history.

(56) References Cited

U.S. PATENT DOCUMENTS

| | | | | |
|---|---|---|---|---|
| 3,826,457 | A | * | 7/1974 | Huot de Longchamp ... 248/564 |
| 3,874,626 | A | * | 4/1975 | Gross et al. ................. 248/562 |
| 4,228,984 | A | | 10/1980 | Thompson et al. |
| 4,384,701 | A | | 5/1983 | Barley |
| 4,448,386 | A | * | 5/1984 | Moorhouse et al. ........ 248/564 |
| 4,856,763 | A | * | 8/1989 | Brodersen et al. .......... 267/131 |
| 4,880,201 | A | * | 11/1989 | Hall et al. .................. 248/575 |
| 5,765,802 | A | | 6/1998 | Bostrom et al. |
| 5,871,198 | A | | 2/1999 | Bostrom et al. |

FOREIGN PATENT DOCUMENTS

| | | |
|---|---|---|
| EP | 1 050 428 A1 | 11/2000 |
| FR | 1475850 | 4/1967 |
| GB | 1208051 | 10/1970 |

* cited by examiner

*Primary Examiner*—Carl D. Friedman
*Assistant Examiner*—Steven Marsh
(74) *Attorney, Agent, or Firm*—Andrus, Sceales, Starke & Sawall, LLP

(57) ABSTRACT

A low profile seat suspension includes a bottom frame adapted to be mounted on a vehicle, and a top frame located above the bottom frame for supporting a seat cushion and seat back thereon. A substantially fully collapsible scissors linkage is interconnected between the bottom frame and the top frame enabling the bottom frame and the top frame to move relative to each other substantially in parallel. A biasing arrangement is disposed between the top frame and the bottom frame and has a preload force urging the top frame away from the bottom frame. A first adjustment mechanism is located in the top frame and selectively enables fore and aft adjustment of the top frame relative to the bottom frame. A second adjustment mechanism is located between the bottom frame and the top frame and selectively enables an adjustment on the biasing arrangement in accordance with the weight of an occupant in the seat by translating a horizontal force applied to an adjustment plate into a vertical force effecting the preload force of the biasing arrangement. The invention is improved wherein an adjustment knob is positioned at a front of the seat and the knob is enabled to move along with the top frame irregardless of the fore and aft adjustment of the top frame relative to the bottom frame.

9 Claims, 8 Drawing Sheets

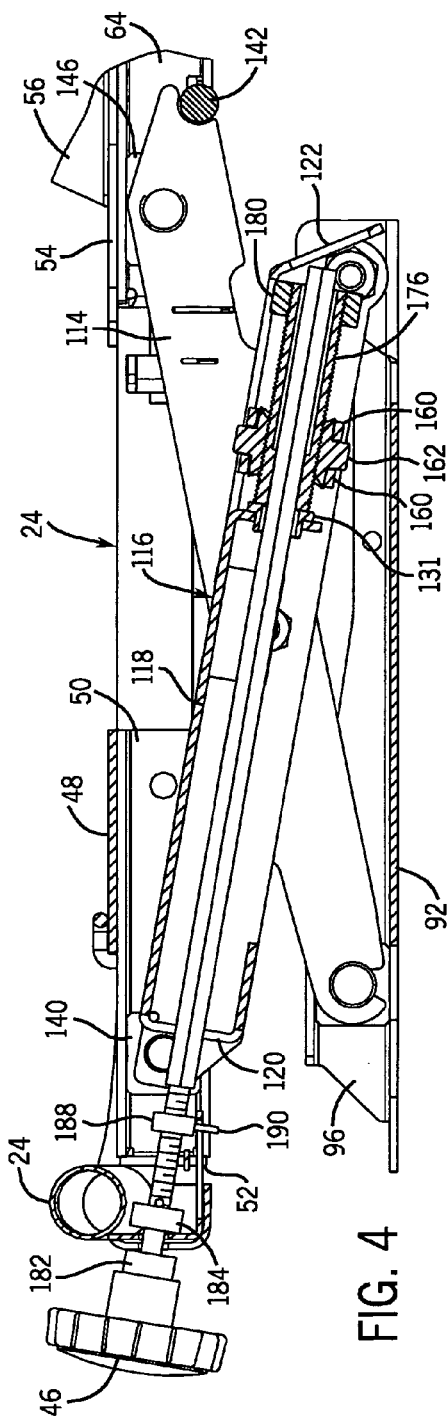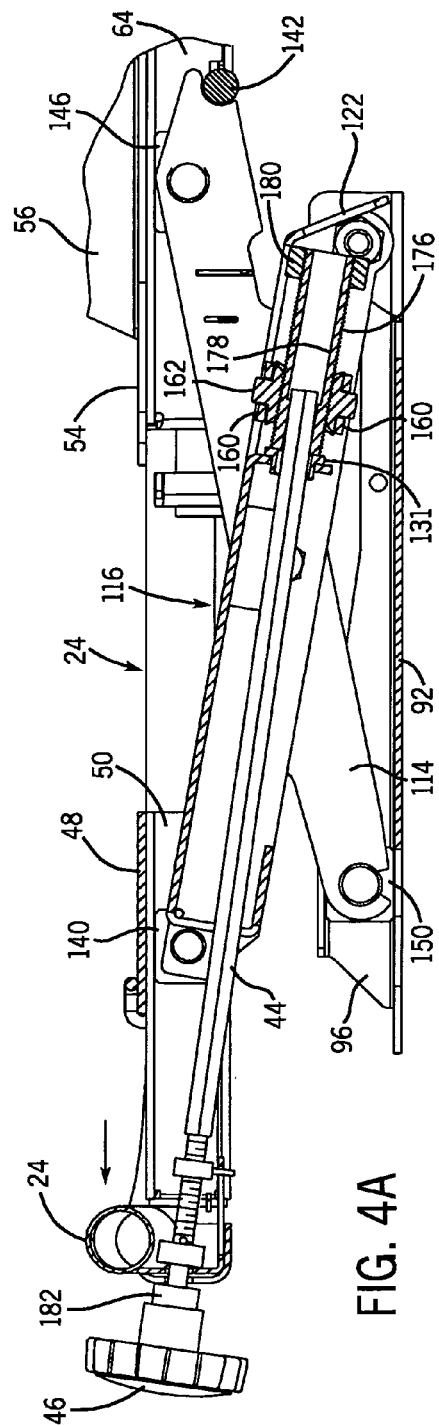

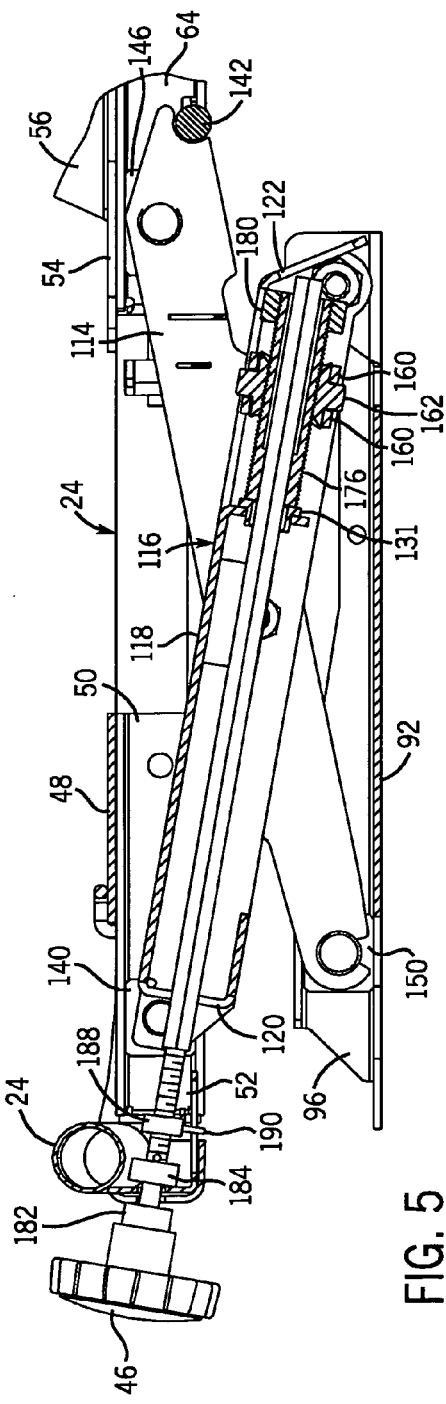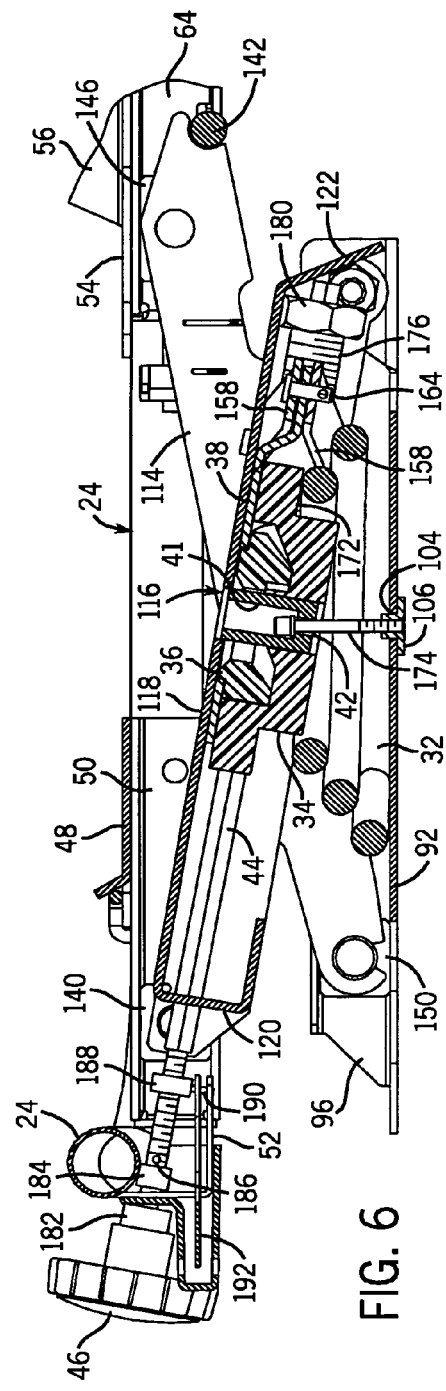

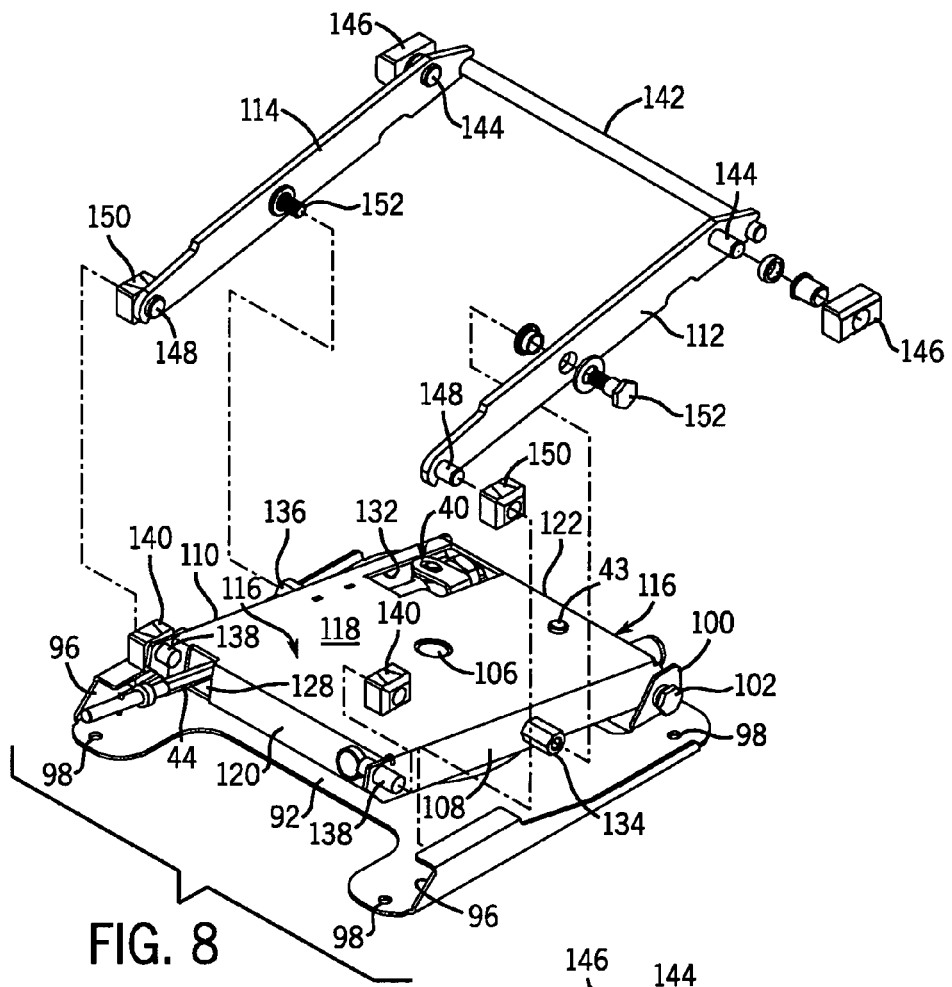

LOW PROFILE SEAT SUSPENSION

CROSS REFERENCE TO RELATED APPLICATION

This application is based on an claims priority from provisional U.S. Patent Application Ser. No. 60/477,618 filed Jun. 11, 2003.

FIELD OF THE INVENTION

This invention relates broadly to a vehicle seat suspension assembly and, more particularly, pertains to a fore and aft seat adjustment mechanism and a seat occupant weight compensation adjustment which collectively provide a vehicle seat suspension having a relatively low profile.

BACKGROUND OF THE INVENTION

As is well known, vehicles, and in particular large trucks, are provided with scissors-type suspensions capable of cushioning extremely heavy loads unlike those normally encountered in the smoother ride of a passenger car. In order to isolate the driver from fatigue and discomfort induced by the vehicle vibrations, it is normal practice to provide seat suspension systems incorporating various spring arrangements which protect the driver from vibrations at the expense of consuming a considerable amount of physical space beneath the seat. This is especially applicable to spring suspension systems which can be adjusted according to the weight of the seat occupant. Some of these seats include slide provisions which enable a fore and aft or longitudinal adjustment of the seat relative to the floor of the vehicle. When a seat is provided with both of the aforementioned adjustments, it must locate its seat frame a considerable distance above the vehicle floor to accommodate them. In addition, the partial collapsibility of the scissors linkage used in the suspensions also contributes to the distance at which the seat is mounted. Often, this distance becomes prohibitively high to be utilized in certain vehicles having relatively small space limitations between the floor and the ceiling. Accordingly, it remains desirable to provide a seat suspension incorporating both a seat occupant weight compensation adjustment and a fore and aft seat adjustment which together with a substantially fully collapsible scissors linkage will ensure a relatively low profile for the seat.

One such seat suspension is disclosed in U.S. Pat. No. 5,765,802 issued Jun. 16, 1998 and U.S. Pat. No. 5,871,198 issued Feb. 16, 1999, both of which are assigned to the assignee of this application. In these patents, a seat suspension includes a fore and aft seat adjustment mechanism and a weight compensation adjustment mechanism in combination with a substantially fully collapsible scissors linkage. While the designs from these patents have performed satisfactorily, improvements can be made to further enhance the performance, ease of adjustment and economy of cost for the seat suspension. For example, in the aforementioned patents, the weight compensation adjustment mechanism is located on the left side of the seat such that upon a forward seat adjustment it is sometimes difficult to access the adjustment knob which may have moved rearwardly beyond the reach of the seat occupant. Moving the adjustment knob to the front of the seat however requires that the weight compensation adjustment mechanism allow the adjustment knob to move back and forth with the fore and aft seat adjustment.

It is a principal object of the present invention to provide a suspension mechanism that is simply constructed and relatively inexpensive while still meeting manufacturers' ever increasing demands for compactness and comfort.

It is also an object of the present invention to provide a suitable suspension unit which will reduce the shocks and vibration transmitted from the vehicle to the driver via the driver's seat.

It is a further object of the present invention to provide a seat suspension having an adjustable preload to suit the weight of the seat occupant.

It is another object of the present invention to provide a seat suspension utilizing a scissors linkage having slide channels which serve as guides for the longitudinal adjustment of the seat.

Yet another object of the present invention to provide a seat suspension having a substantially fully collapsible scissors linkage.

It is also an object of the present invention to provide a seat suspension with a weight compensation adjustment which is always accessible irregardless of the longitudinal adjustment of the seat.

In one aspect of the invention, a low profile seat suspension includes a bottom frame adapted to be mounted on a vehicle, and a top frame located above the bottom frame for supporting a seat cushion and seat back thereon. A substantially fully collapsible scissors linkage is interconnected between the bottom frame and the top frame enabling the bottom frame and the top frame to move relative to each other substantially in parallelism. A biasing arrangement is disposed between the top frame and the bottom frame and has a preload force urging the top frame away from the bottom frame. A first adjustment mechanism is located in the top frame and selectively enables fore and aft adjustment of the top frame relative to the bottom frame. A second adjustment mechanism is located between the bottom frame and the top frame and selectively enables an adjustment on the biasing arrangement in accordance with the weight of an occupant in the seat by translating a horizontal force applied to an adjustment plate into a vertical force affecting the preload force of the biasing arrangement. The adjustment plate has a cam engaged therewith and the horizontal force slidably moves the adjustment plate and cams a resilient element of the biasing arrangement in a vertical direction. The invention is improved wherein an adjustment knob of the second adjustment mechanism is positioned at a front of the seat and the knob is enabled to move along with the top frame irregardless of the fore and aft adjustment of the top frame relative to the bottom frame.

Various other objects, features and advantages of the invention will be made apparent from the following description taken together with the drawings.

BRIEF DESCRIPTION OF THE DRAWINGS

The drawings illustrate the best mode presently contemplated in carrying out the invention. In the drawings:

FIG. 4 is a sectional view taken on line 4—4 of FIG. 3 showing the weight compensation mechanism in an initial setting;

FIG. 4A is a view like FIG. 4 showing a forward adjustment of the seat supporting frame and the manner in which the adjustment knob and the rod of the weight compensation adjusting mechanism move therewith;

FIG. 5 is a view like FIG. 4 showing the weight compensation adjusting mechanism in a subsequent setting;

FIG. 6 is a sectional view taken on line 6—6 of FIG. 3 showing the weight compensation adjustment mechanism in the setting of FIG. 4;

FIG. 8 is an exploded view of the scissors linkage of the seat suspension;

FIG. 9 is a perspective view of FIG. 8 in an assembled condition; and

DETAILED DESCRIPTION

Figure 1:
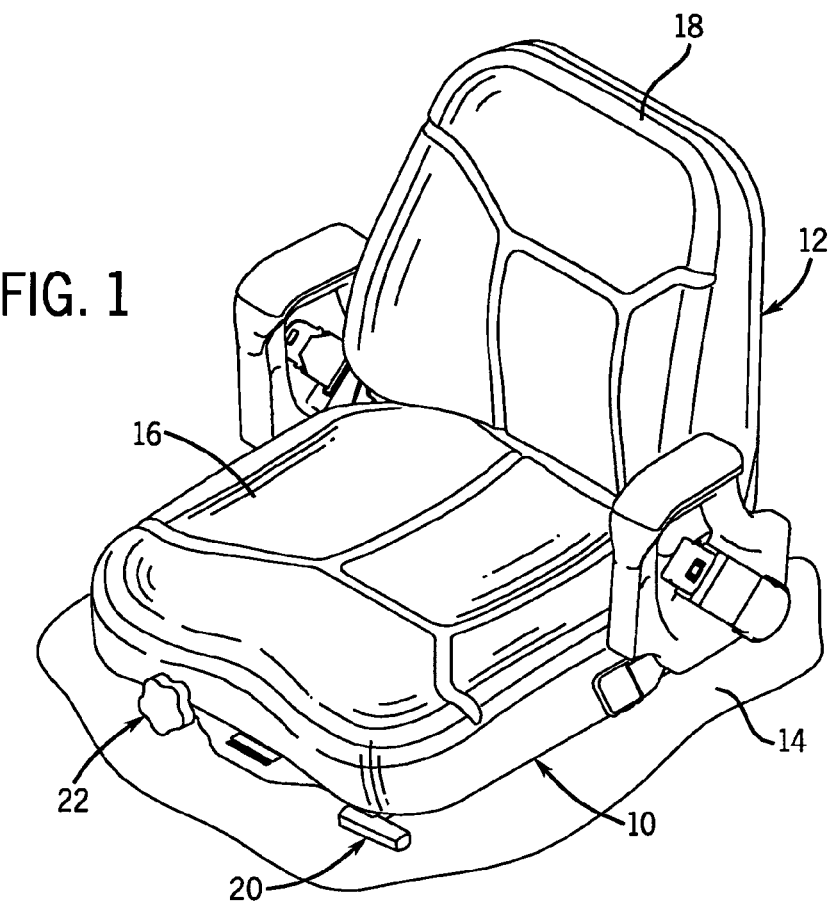
FIG. 1 is a perspective view of a vehicle seat employing the seat suspension of the present invention and showing a fore and aft seat adjusting mechanism, and a weight compensation adjusting mechanism.

Referring now to FIG. 1, a vehicle seat suspension embodying the present invention and generally identified by the reference numeral 10 is shown incorporated into the base or bottom portion of a vehicle seat 12 which is anchored to a floor 14 of the vehicle. As is well known, the vehicle seat 12 includes a seat cushion 16 and a seat back 18 which may be either fixed or pivotally adjustable with respect to the seat cushion 16. A first adjusting mechanism 20 is provided to longitudinally adjust the position of the vehicle seat 12 relative to the floor 14 of the vehicle. A second adjusting mechanism 22 is provided to alter the resilient suspension of the vehicle seat 12 according to the weight of the seat occupant. As will be described, the arrangement of components in the seat suspension 12 results in the seat having a relatively low profile desirable to purchasers of such suspensions.

Figure 2:
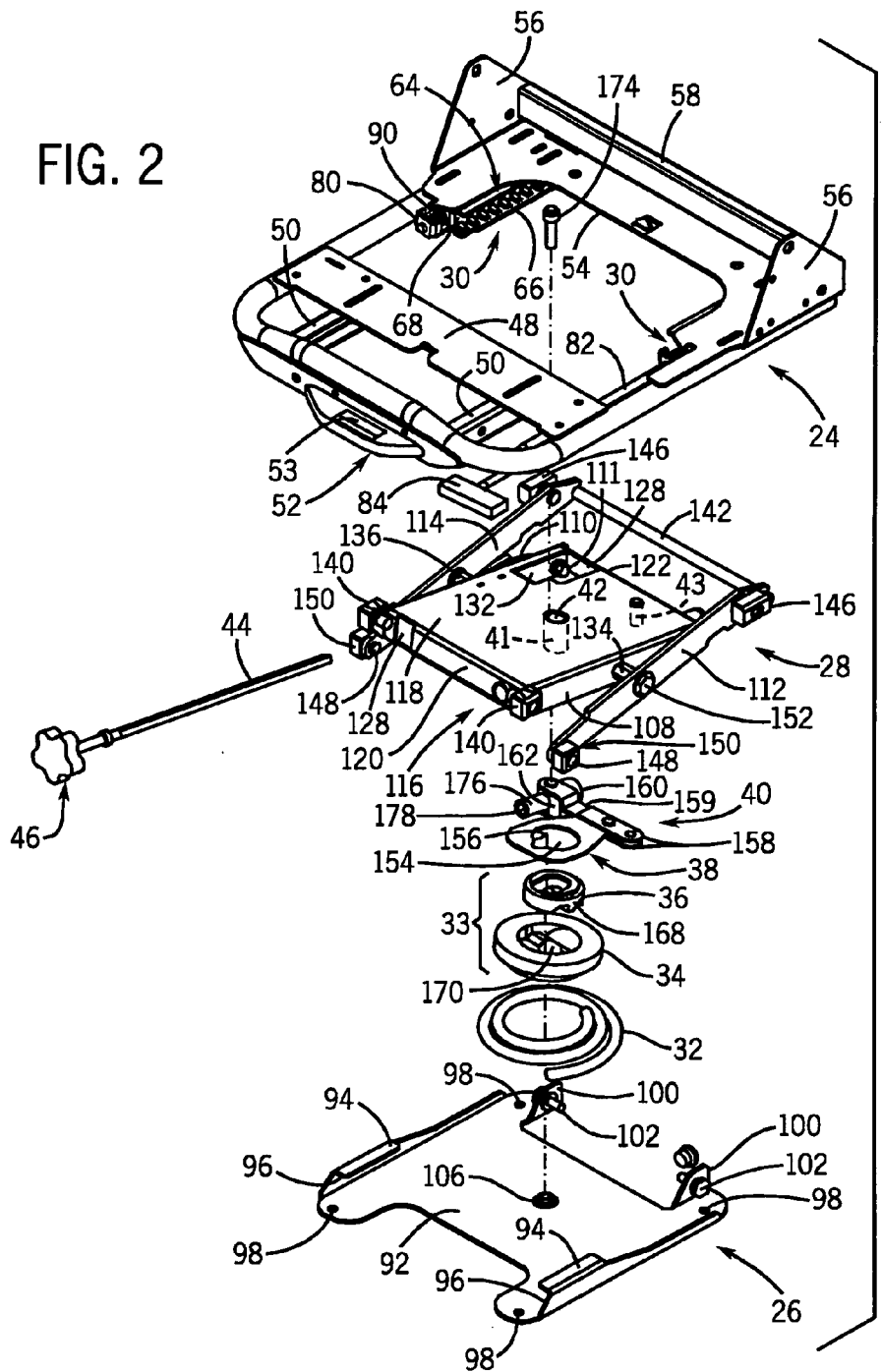
FIG. 2 is an exploded, perspective view of the seat suspension in FIG. 1.

Turning to the exploded view in FIG. 2, the vehicle suspension 10 includes a top frame 24, a bottom frame 26 and a substantially fully collapsible scissors linkage 28 interposed between the top frame 24 and the bottom frame 26. The first adjusting mechanism 20 is conveniently isolated in the top frame 24 and comprises a pair of adjustment channel assemblies 30. The second adjusting mechanism 22 is located between the top and bottom frames 24, 26, respectively, and comprises a suspension spring 32, a cam assembly 33 defined by a cam follower 34 and a cam 36, an adjustment paddle or strap 38, a weight adjusting arm assembly 40, a cylindrical coupling 41 with a throughhole 42, a clevis pin 43, and a long rod 44 attached to a weight adjustment knob 46.

Figure 10:
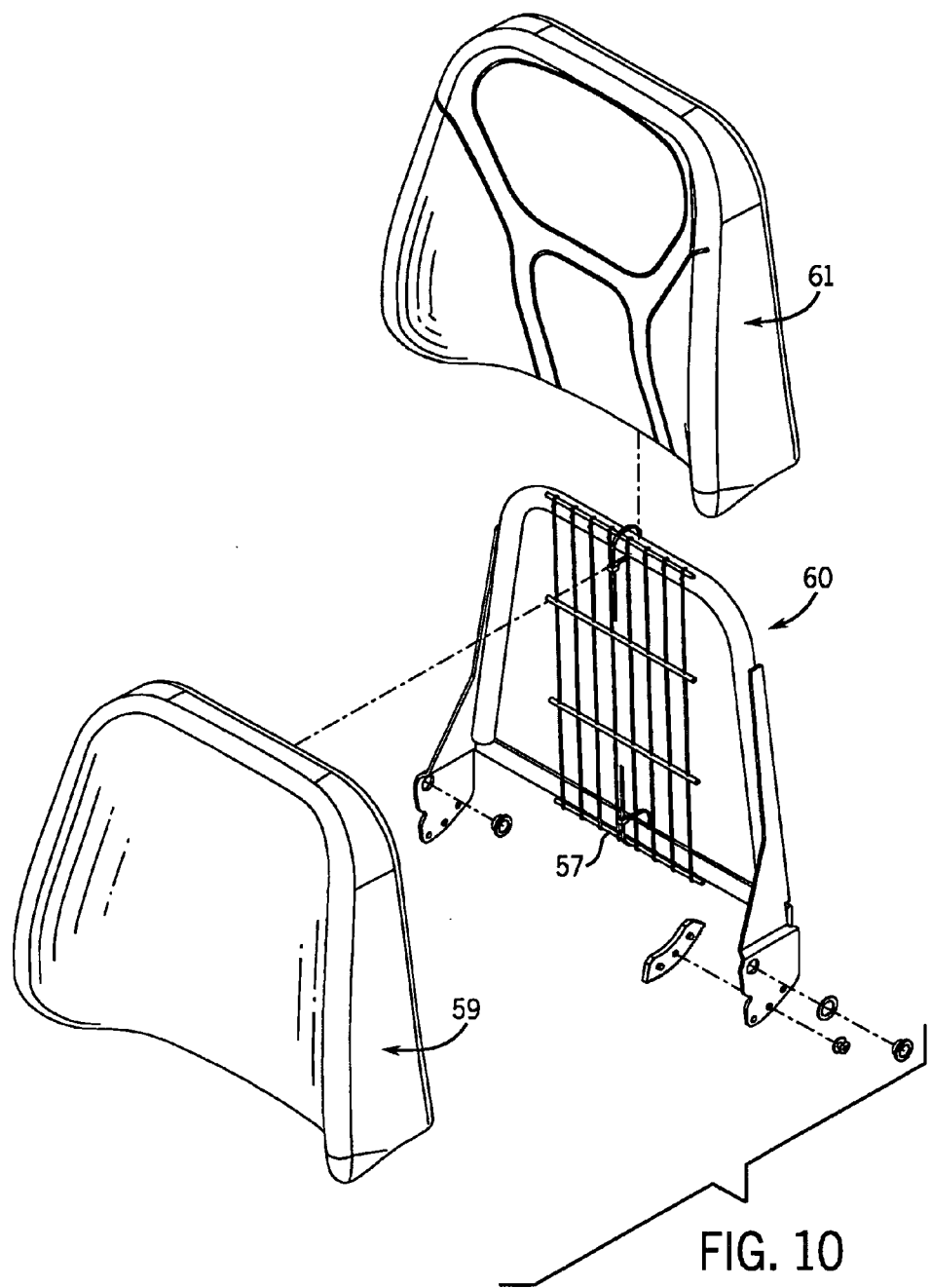
FIG. 10 is an exploded view of the seat back.

Top frame 24 is a generally U-shaped, steel tubular structure for supporting seat cushion 16 thereon. A forward portion of the tubular structure 24 includes a transverse support strap 48, and a pair of slide channels 50 extending between the strap 48 and the front of the tubular structure 24 on respective bottom surfaces thereof. Ends of the channels 50 define front and rear limits of travel for components of the scissors linkage 28 to be described later. An indicating and rod holding bracket 52 having a recess 53 (FIG. 3) is welded to the front of the tubular structure 24. A rear portion of the tubular structure 24 includes a recessed, planar mounting bracket 54 having a pair of spaced apart, upstanding mounting walls 56 interconnected by a rear cross brace 58. As will be explained hereafter, the mounting walls 56 facilitate pivotal attachment of a seat back frame 60 (FIG. 10) thereto. The seat back frame 60 has a support 57 for supporting a foam back 59 over which a cover 61 is slipped to form seat back 18. The spaced apart channel assemblies 30 are attached to a bottom surface of the mounting bracket 54 on opposed sides thereof, and are operably tied together by a connecting wire 62 in FIG. 3.

Figure 3:
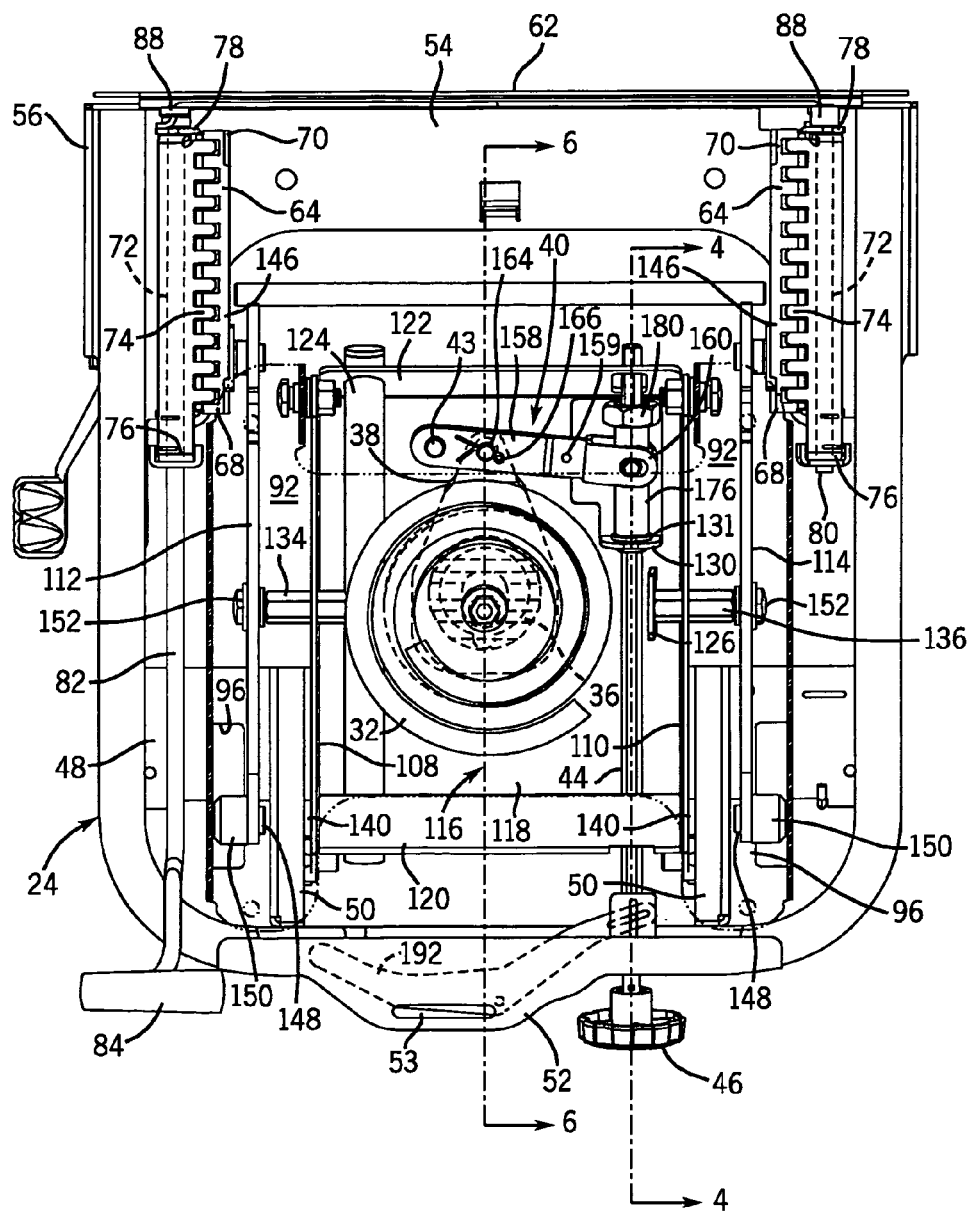
FIG. 3 is a bottom view of the seat suspension of FIG. 1 in assembled form with portions of the base plate removed.

With reference to FIGS. 2 and 3, each top frame channel assembly 30 includes an elongated adjusting channel 64 which is C-shaped in cross section and has a bottom wall formed with a number of slots 66 along its length. Each channel 64 also has a front ear 68 and a rear ear 70 formed with aligned circular openings. A comb 72 which is U-shaped in cross section, has a bottom wall formed with a plurality of teeth 74, and also has a front tab 76 and a rear tab 78. Each adjusting channel 64 is juxtaposed relative to its comb 72 such that the teeth 74 of comb 72 are receivable in slots 66 of adjustment channel 64, and openings formed in ears 68, 70 are aligned with apertures formed in tabs 76, 78. On each adjustment channel assembly 30, an elongated release rod 80 extends through the aligned openings and apertures. The release rod 80 on the left side of the vehicle seat 12 includes an extension 82 which runs beyond the front end of the seat 12 and terminates in a handle 84 accessible to the seat occupant outside the left front corner of the seat 12. The forward end of each release rod 80 includes a U-shaped turning channel 86 fixed thereto which abuts front tab 76 on comb 72. As seen in FIG. 3, the rear end of each release rod 80 projects beyond rear tab 78, and is received in a wire eye 88 carrying connecting wire 62. A torsion latch spring 90 (FIG. 2) surrounds a forward portion of release rod 80 and is interposed between front ear 68 of adjusting channel 64 and front tab 76 of comb 72. Each torsion latch spring 90 is positioned to normally retain teeth 74 of each comb 72 in the slots 66 of its respective adjusting channel 64.

Referring back to FIG. 2, the bottom frame 26 is a generally H-shaped steel base plate 92 having bent side edges 94 which form opposite side channels 96. Holes 98 formed in the corners of base plate 92 can be used to receive studs (not shown) extending upwardly from the vehicle floor 14 and nuts (not shown) can be screwed onto the studs so as to fix the base plate 92 relative to the vehicle floor 14. The base plate 92 has a pair of mounting segments 100 carrying suitable fasteners 102 to enable a connection to a portion of the scissors linkage 28. The base plate 92 is also provided with a central opening 104 (FIG. 6) which receives a nut 106 used to secure the base plate 92 with the suspension superstructure.

With reference to FIGS. 2, 8 and 9, top frame 24 and bottom frame 26 are connected one above the other in parallel by scissors linkage 28 formed by a pair of inner links 108, 110, and a pair of outer links 112, 114. The inner links 108, 110 are formed by the bent side portions of a generally rectangular inner arm assembly 116 having a steel support plate 118 and bent front and rear portions 120, 122, respectively. FIG. 3 shows that on one side of the inner arm assembly 116, a reinforced tube 124 extends between the respective front and rear portions 120, 122. On the other side, an inner arm reinforcement tab 126 projects upwardly from the plate 118, and a pair of aligned openings 128 (FIG. 2) are formed in the respective front and rear portions 120, 122 to receive the long rod 44 of the weight compensating adjustment mechanism 22. A protrusion 130 (FIG. 3) extends upwardly from the plate 118 and has a hole aligned with the openings. The protrusion 130 carries a rotatable bearing 131 through which the rod 44 is passed. The cylindrical coupling 41 and the clevis pin 43 also extend downward from the plate 118. A rear corner area of the plate 118 is cut out at 132 to accommodate a portion of the weight adjusting arm assembly 40. Inner link 108 has a couplingnut 134 welded to it and the reinforcement tube 124, and extends laterally through and outside the link 108. The opposite inner link 110 has a coupling nut 136 welded to it and to the inner arm reinforcement tab 126, and extends laterally through and beyond the link 110. Forward ends of the inner links 108, 110 carry pins 138 for mounting a first pair of slide blocks 140 slidably received in the slide channels 50 at the front of top frame 24. Rearward ends of the inner links 108, 110 have holes and nuts (one being seen at 111 in FIG. 2) welded to the inner surfaces of the inner links 108, 110 to receive the fasteners 102 in the mounting segments 100 of base plate 92.

The outer links 112, 114 are joined at rearward ends by a transfer shaft 142. The rearward ends of the outer links 112, 114 are provided with pins 144 for mounting adjusting blocks 146 slidably received in the adjustment channel assemblies 30 on the top frame 24. The forward ends of the outer links 112, 114 are equipped with pins 148 for mounting a second pair of slide blocks 150 which are slidably accommodated in the side channels 96 on bottom frame 26. A midportion of each outer link 112, 114 is operably connected to a midportion of each inner link 108, 110 by a bolt 152 threaded into one of the coupling nuts 134, 136.

FIGS. 2–7 illustrate the unique weight compensation adjustment mechanism 22. Cylindrical coupling 41 and clevis pin 43 extend vertically downwardly from the underside of formed inner arm plate 118. Coupling 41 passes through a notched hole 154 formed by a continuous wall 156 on a distal end of adjustment strap 38 in underlying contact with the plate 118. The peripheral size of the hole 154 is larger than the diameter of the coupling 41 so that the coupling 41 lies in spaced relationship to wall 156. A proximal end of the adjustment strap 38 is joined to the weight adjusting arm assembly 40. More particularly, the assembly 40 has a pair of spaced apart, arms 158 held together by a rivet 159 and defining a pair of bifurcated legs 160 between which a clevis nut 162 is rotatably mounted. The proximal end of the adjustment strap 38 is received between the arms 158 and retained by a clevis pin 164 and a cotter pin 166 such that there is freedom for relative movement between the adjustment strap 38 and the spaced apart arms 158. The arms 158 have two aligned holes for receiving the clevis pin 43 in order that the arms 158 may rotate thereon. The coupling 41 also passes through the cam 36, the cam follower 34 and at least a portion of the spring 32. The cam 36 is oriented into the notched hole 154 on the adjustment strap 38 such that a boss on the cam 36 aligns with the notch in the hole 154 to prevent rotational movement of the cam 36 relative to the adjustment strap 38. The cam 36 has a cavity so as to enable relative motion between the cam 36 and the coupling 41. The cam 36 contains a series of inclined wedges or ramps 168 engageable with complimentary ramped surfaces 170 on cam follower 34. Extending outwardly from the base of the cam follower 34 is a lip 172 which serves to seat small or upper end of the spring 32 that encircles the cam follower 34. The spring 32 includes a large or lower end which is seated against the base plate 92. Spring 32 is installed with a predetermined preload force which urges top frame 24 away from bottom frame 26. An upstop or fastener 174 is inserted through the coupling throughhole 42 and has a threaded end which is received in the nut 106 fitted into base plate 92 so as to hold together the scissors linkage 28, the adjuster strap 38, the weight adjustment arm assembly 40, the cam 36, the cam follower 34, the spring 32 and the base plate 92. The fastener 174 is threaded into the nut 106 for such a distance as to set the maximum distance between the seat 16 and the base plate 92. It should be appreciated that the fastener 174 passes through the neutral axis of the spring 32 and counteracts the load pressure thereof to allow lighter components in the suspension. By offsetting the load, these light weight components remain straight and functional. Use of the fastener 174 facilitates not placing the base plate 92 in a bending load.

An adjuster screw 176 has external threads engageable with internal threads of a clevis nut 162, and has a forward end engaged against the bearing 131. The adjuster screw 176 has an internal hex 178 (FIG. 4A) which matingly receives a hex-shaped periphery of the long rod 44. Rotating the rod 44 will thus turn the adjuster screw 176 relative to the clevis nut 162 yet will allow the long rod 44 to freely slide through adjuster screw 176 when fore and aft adjustment is made. A jam nut 180 is threaded onto a rearward end of the adjuster screw 176 to act as a travel limitation device for the clevis nut 162. The long rod 44 is assembled into the adjuster screw 176 by passing the rod 44 through openings in the respective front and rear portions 120, 122 of the inner arm assembly 116 and the hole in the protrusion 130. As seen best in FIG. 4, the weight compensation knob 46 is mechanically fastened with a jam nut 182 to a forward end of the long rod 44 so as to transmit rotational motion. The long rod 44 is inserted into a hole formed in the bracket 52 at the front of the tubular structure 24. A spacer 184 and a spring pin 186 are located in such a way so as to hold the knob 46 in a position relative to seat tube 24. A weight adjusting nut 188 is attached to the long rod 44 and has an extension 190 which projects into aligned grooves on the bracket 52 and an arm-like, weight adjusting indicator 192.

With the above structure, the inner links 108, 110 and the outer links 112, 114 can be spaced from each other such that the first pair of slide blocks 140 are almost at the same level as the second pair of slide blocks 150 when scissors linkage 28 is substantially fully collapsed. In such position, the spring 32 is compressed by applying a heavy load on seat cushion 16 such that the spring coils are tightly bounded together upon one another. Arranging the links 108 through 114 and the spring 32 in a particular fashion will create additional clearance which places the seat 12 in a particularly low profile.

In use, let us assume it is desired to change the fore and aft position of the seat 12 from the rearward position of FIG. 4 to the forward position of FIG. 4A. One grasps handle 84 and against the bias of spring 90 lifts and rotates the extension 82 and release rod 80 on the left front side of seat 12 which rotational motion is transferred by connecting wire 62 to the right side of seat 12. Such rotation moves the teeth 74 on combs 72 out of engagement with the slots 66 on adjusting channels 64 allowing the adjusting blocks 146 to slide in the adjusting channel 64 and permitting the first pair of slide blocks 140 to slide in the top front channels 50. Once a desired slide position is reached, handle 84 is released and latch spring 90 will rotate and return each release rod 80 such that the teeth 74 will again engage slots 66 thereby locking seat 12 in position. By this construction, top frame 24 holding seat cushion 16 can be selectively adjusted forwardly and rearwardly relative to scissors linkage 28 which is connected to the bottom frame 26.

As a feature of the invention, the long rod 44 of the weight compensation adjustment mechanism 22 slides freely through the interior 178 of the screw 176 as the fore and aft adjustment is made (FIG. 4A). This allows the adjustment knob 46 to travel with the front edge of the top frame 24 on which seat cushion 16 is mounted so that the knob 46 is always easily accessible to the seat occupant irregardless of the seat fore and aft position.

Figure 7:
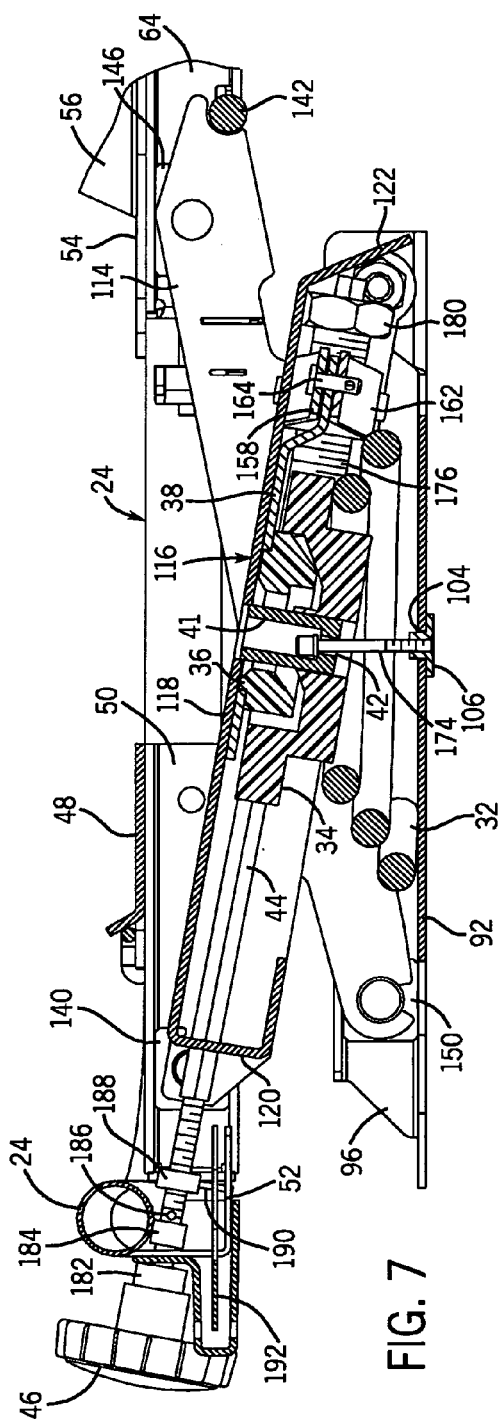
FIG. 7 is a view like FIG. 6 showing the weight compensation adjustment mechanism in the setting of FIG. 5.

Now assume it is desired to change the preload force on the suspension spring 32 from the lower setting of FIG. 6 to the higher setting of FIG. 7 depending on the weight of the seat occupant. One conveniently turns the adjustment knob 46 outside the right front edge of seat 12. As the knob 46 is turned in such a manner to increase the preload, a rotation of long rod 44 will cause rotation of the adjuster screw 176 and cause the clevis nut 162 to move in a direction towards the jam nut 180. The motion of the clevis nut 162 causes a rotation in adjuster arms 158 and applies a horizontal force to adjuster strap 38 through clevis pin 43. The movement of adjusting strap 38 moves the cam 36 in relation to the cam follower 34 causing the latter to rise over cam 36 and increase the compression or preload of spring 32 resulting in a stiffer ride.

It should be noted that as the knob 46 is rotated, the invention provides a relative indication of the weight compensation adjustment. In particular, rotation of the knob 46 and nut 188 causes the arm-like indicator 192 to move relative to the recess 53 formed in the bracket 52. The amount of surface area of the indicator 192 seen through the recess 53 gives a visual indication to the seat occupant of the amount of the weight compensation adjustment.

While the invention has been described with reference to a preferred embodiment, those skilled in the art will appreciate that certain substitutions, alterations and omissions may be made without departing from the spirit thereof. Accordingly, the foregoing description is meant to be exemplary only, and should not be deemed limitative on the scope of the invention set forth with the following claims.

We claim:

1. In a low profile seat suspension having a bottom frame adapted to be mounted on a vehicle, a top frame located above the bottom frame for supporting a seat cushion having a front and a seat back thereon, a substantially fully collapsible scissors linkage being interconnected between the bottom frame and the top frame enabling relative movement therebetween substantially in parallelism, a bearing arrangement disposed between the top frame and the bottom frame and having a bearing force urging the top frame away from the bottom frame, a first adjustment mechanism located in the top frame and extending forwardly therefrom in front of the seat cushion for selectively enabling fore and aft adjustment of the top frame relative to the bottom frame, a second adjustment mechanism located between the top frame and the bottom frame for selectively enabling an adjustment of the bearing arrangement in accordance with a body weight of an occupant facing towards the front of the seat cushion by translating a horizontal force applied to an adjustment plate into a vertical force affecting the preload force of the bearing arrangement, the adjustment plate being engaged with a cam wherein the horizontal force slidably moves the adjustment plate and carries a resilient element of the bearing arrangement in a vertical direction, the improvement wherein:

the second adjustment mechanism is constructed and arranged to include an adjustment knob that extends forwardly from the top frame in front of the seat cushion along with the first adjustment mechanism in spaced relationship therefrom, and is enabled to move along with the top frame irregardless of the fore and aft adjustment of the top frame relative to the bottom frame.

2. The improvement of claim 1, the second adjustment mechanism is positioned between the bottom frame and the scissors linkage and includes a spring disposed against the bottom frame, a cam disposed above and against the spring, a cam follower engaged with the cam, the adjustment plate non-rotatably engaged with the cam follower, a weight adjusting arm assembly connected to the adjustment plate and mounted for rotation on the scissors linkage, a coupling depending from the scissors linkage and projecting through the adjustment plate, cam, cam follower and at least a portion of the spring, a fastener joining the coupling to the bottom frame and a rotatable adjustment rod extending between the adjustment knob and the weight adjusting arm assembly.

3. The improvement of claim 2, wherein the scissors linkage carries a rotatable bearing through which the adjustment rod is passed.

4. The improvement of claim 3, wherein the weight adjusting arm assembly includes a pair of bifurcated legs between which a clevis nut is rotatably mounted, the clevis nut having internal threads engageable with external threads on an adjuster screw mounted on the rotatable bearing, the adjuster screw having an internal hex for matingly receiving a hex-shaped periphery of the adjustment rod such that rotation of the adjustment rod will turn the adjuster screw relative to the clevis nut and allow the adjustment rod to simultaneously slide through the internal hex when fore and aft adjustment is made.

5. The improvement of claim 4, wherein the adjustment plate is connected to the bifurcated legs and the bifurcated legs are pivotally secured to a support plate of the scissors linkage such that rotation of adjustment rod enables rotation of adjustment screw causing movement of clevis nut and rotation of the bifurcated legs so as to apply a horizontal force to the adjustment plate whereby the movement of the adjustment plate moves the cam relative to the cam follower so as to change the compression of spring and provide a desired ride cushioning for the occupant of the seat cushion.

6. The improvement of claim 2, wherein the top frame includes a bracket for guiding a weight adjusting indicator attached to the adjustment rod.

7. The improvement of claim 6, wherein the bracket includes a recess framing the indicator wherein rotation of the adjustment rod causes the indicator to move relative to the recess, the amount of surface area of the indicator seen through the recess forming a visual indication to the occupant of the seat cushion of the amount of weight compensation adjustment for the occupant.

8. The improvement of claim 1, wherein the seat back is pivotally mounted to the top frame.

9. The improvement of claim 2, wherein the fastener passes through a neutral axis of the spring and counteracts load pressure thereof to allow lighter components in the suspension and keep the suspension straight.

* * * * *